US008732338B2

(12) United States Patent
Hutchison et al.

(10) Patent No.: US 8,732,338 B2
(45) Date of Patent: May 20, 2014

(54) MESH NETWORK BRIDGE ROUTING

(75) Inventors: David J. Hutchison, Rochester, MN (US); Adam D. Dirstine, Rochester, MN (US); Pamela A. Wright, Rochester, MN (US); Jeffrey M. Ryan, Byron, MN (US); Steven L. Halter, Rochester, MN (US); Christopher Glen Popp, Winona, MN (US)

(73) Assignee: Digi International Inc., Minnetonka, MN (US)

( * ) Notice: Subject to any disclaimer, the term of this patent is extended or adjusted under 35 U.S.C. 154(b) by 597 days.

(21) Appl. No.: 12/604,036

(22) Filed: Oct. 22, 2009

(65) Prior Publication Data
US 2010/0332605 A1 Dec. 30, 2010

Related U.S. Application Data

(60) Provisional application No. 61/220,849, filed on Jun. 26, 2009.

(51) Int. Cl.
*G06F 15/16* (2006.01)

(52) U.S. Cl.
USPC ........................................................ 709/250

(58) Field of Classification Search
USPC ................... 709/217, 238–250; 455/428, 445
See application file for complete search history.

(56) References Cited

U.S. PATENT DOCUMENTS

| | | | | |
|---|---|---|---|---|
| 7,693,167 | B2 * | 4/2010 | Koenck et al. | 370/419 |
| 7,733,224 | B2 * | 6/2010 | Tran | 340/540 |
| 8,014,329 | B2 * | 9/2011 | Gong | 370/311 |
| 8,150,416 | B2 * | 4/2012 | Ribaudo et al. | 455/456.1 |
| 8,605,657 | B2 * | 12/2013 | Hwang et al. | 370/328 |
| 2003/0096605 | A1 * | 5/2003 | Schlieben et al. | 455/419 |
| 2003/0101283 | A1 * | 5/2003 | Lewis et al. | 709/246 |
| 2003/0109248 | A1 * | 6/2003 | Lewis | 455/412 |
| 2003/0109271 | A1 * | 6/2003 | Lewis et al. | 455/517 |
| 2003/0110212 | A1 * | 6/2003 | Lewis | 709/203 |
| 2003/0131311 | A1 * | 7/2003 | McNamara | 714/809 |
| 2003/0153302 | A1 * | 8/2003 | Lewis et al. | 455/412 |
| 2006/0171352 | A1 * | 8/2006 | Seo et al. | 370/328 |
| 2006/0270408 | A1 * | 11/2006 | Kobayashi et al. | 455/440 |
| 2007/0066326 | A1 * | 3/2007 | Agarwal et al. | 455/466 |
| 2007/0201435 | A1 * | 8/2007 | Fisher | 370/352 |
| 2008/0004904 | A1 * | 1/2008 | Tran | 705/2 |
| 2009/0010190 | A1 * | 1/2009 | Gong | 370/311 |
| 2009/0111456 | A1 * | 4/2009 | Shaffer et al. | 455/422.1 |
| 2009/0143051 | A1 * | 6/2009 | Kim | 455/414.2 |
| 2009/0167522 | A1 * | 7/2009 | Coty et al. | 340/539.1 |
| 2009/0225751 | A1 * | 9/2009 | Koenck et al. | 370/389 |
| 2010/0150038 | A1 * | 6/2010 | Nanda et al. | 370/310 |
| 2010/0150077 | A1 * | 6/2010 | Nanda et al. | 370/328 |
| 2010/0182929 | A1 * | 7/2010 | Abraham et al. | 370/252 |

* cited by examiner

*Primary Examiner* — Sargon Nano
(74) *Attorney, Agent, or Firm* — Fogg & Powers LLC

(57) ABSTRACT

A wireless mesh network server is operable to receive a message to one or more mesh network nodes from a client external to the mesh network, the message comprising an alias identifying the one or more mesh network nodes. The server is further operable to identify the one or more receiving mesh network nodes by the received message alias via an alias table, and forward the received message to the one or more mesh network nodes identified by the alias.

20 Claims, 1 Drawing Sheet

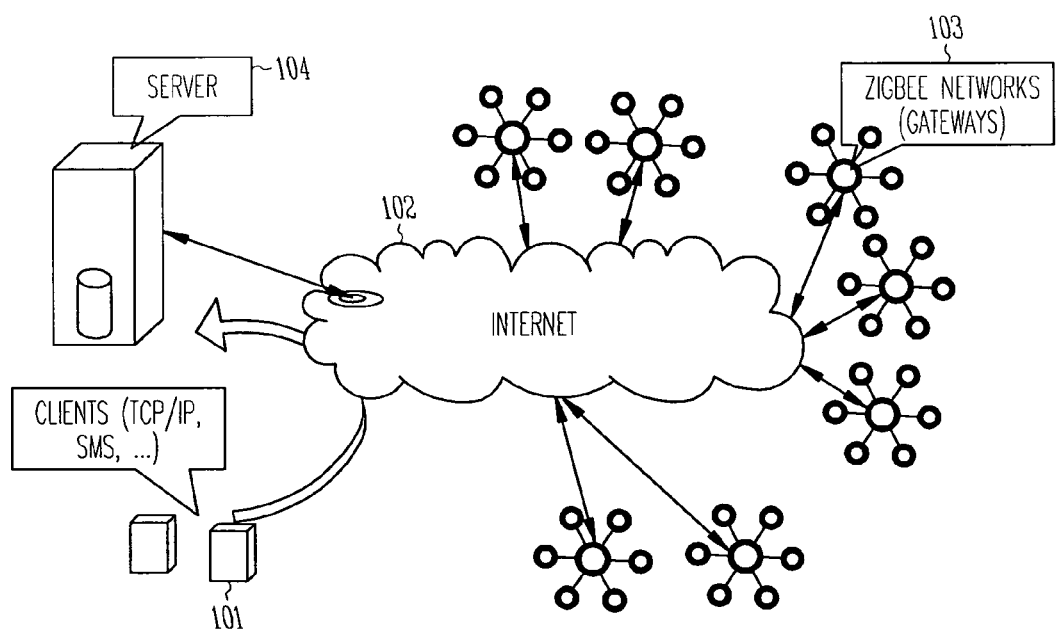

MESH NETWORK BRIDGE ROUTING

RELATED APPLICATION

This application claims the priority benefit under 35 U.S.C. 119(e) of U.S. Provisional Application Ser. No. 61/220,849, filed Jun. 26, 2009, which application is incorporated herein and made a part hereof in its entirety.

FIELD OF THE INVENTION

The invention relates generally to mesh networks, and more specifically in one embodiment to routing network traffic between a mesh network and an external network.

BACKGROUND

Although computer networks have become relatively common both in office and in home networking environments, such networks are typically fairly sophisticated and require significant processing power, electrical power, and infrastructure to work well. Some networking applications do not require so robust a network environment, but can benefit from the ability to provide electronic communications between devices.

One such example is the Bluetooth technology that enables a cell phone user to associate and use an earpiece in what is sometimes referred to a personal area network or PAN. Another example is a mesh network, in which a number of devices work together to form a mesh, such that data can be sent from a source device to a destination device via other devices in the mesh network.

Mesh networks often include multiple links from a network node to other network nodes nearby, and can thereby provide routing around broken links or paths by discovering other routes through the mesh to a destination node. New nodes to a mesh network are typically able to automatically discover the mesh network when they are activated in the vicinity of a compatible mesh network, and can easily join the network.

Mesh networks are typically made up of network nodes that are not mobile, and so link quality and reliability is relatively slow to change. Most applications of mesh networks rely on radio frequency communications to transfer data between network nodes, as running cables between nodes defeats somewhat the intended ease of installation and use of mesh network devices.

Mesh network device installations often have multiple networks deployed in remote locations, and are managed from a central location or server. The central location computer might have knowledge of what devices are within each of the mesh networks under management, but typically does not have direct access to the networks or knowledge of the mesh network addressing scheme. For example, a mesh network controller might monitor an array of temperature and humidity sensors in a warehouse, but will not know the ZigBee network address of a particular sensor in a ZigBee mesh network.

There exists a need to provide wireless mesh network technology that addresses factors such communication with various mesh network nodes.

SUMMARY

One example embodiment of the invention comprises a wireless mesh network server is operable to receive a message to one or more mesh network nodes from a client external to the mesh network, the message comprising an alias identifying the one or more mesh network nodes. The server is further operable to identify the one or more receiving mesh network nodes by the received message alias via an alias table, and forward the received message to the one or more mesh network nodes identified by the alias.

BRIEF DESCRIPTION OF THE FIGURES

FIG. 1 shows an example network comprising clients, mesh networks, and a mesh network alias server, consistent with an example embodiment of the invention.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Mesh networks are often used to route data between various elements or nodes in a network made up of a number of loosely assembled nodes. Many mesh networks are designed such that a compatible node can easily join the network and receive and send data, including passing received data long a route to an intended destination node. Mesh networks are therefore considered self-arranging and self-healing, in that if a node becomes inoperable or loses a connection to another node, data can be easily routed around the broken network link.

Many mesh network technologies use wireless communication, further enhancing the ease of use of mesh networking for certain applications. Because mesh network nodes are typically stationary, wireless connections between various nodes can be formed and characterized by searching a known frequency or radio band for other mesh network nodes as new wireless nodes are added to the mesh network. Recent reductions in cost and advancement in wireless networking technology has made use of mesh networking for a variety of applications a desirable alternative to using a more structured network such as a TCP/IP network or other type of network.

One example of a mesh network standard using wireless radio communication is the ZigBee mesh network, which was developed by an industry alliance and is related to IEEE standards including 802.15.4. The retail price of ZigBee-compliant transceivers is nearly a dollar, and a transceiver, memory, and processor can be bought for a few dollars in quantity, making integration of mesh network technology into inexpensive electronic devices a practical option. The standard is intended to support low power consumption at reasonably low data rates, and provides a self-organizing network technology that works well for applications such as control, monitoring, sensing, and home automation.

In this example of wireless mesh technology, one node operates as a coordinator, forming the root of the mesh network and performing other functions such as bridging to other networks and handling encryption keys. Most nodes are router nodes, which can receive and send data, including passing data along to other nodes. In some embodiments, end device nodes contain just enough functionality to receive and send data, but cannot route or pass data from a sending node to a different receiving node. While this preserves battery life and reduces the cost of the node, end device nodes are unable to contribute to the routing functions of the mesh network, and so will typically not make up a large percentage of a mesh network's nodes.

Although various nodes in the mesh network can communicate with other nodes using the node ID of the destination node, they do so in a different way than TCP/IP or many other network types. Each node in a ZigBee network sends a regular link status message, enabling its neighbor nodes to record the neighboring node as a neighbor, along with other information such as the link quality or signal strength. The paths within the network are managed within the individual router nodes that make up the bulk of the network, which maintain routing information regarding their links directly to other nodes but do not contain full routing capability. For example, a ZigBee node may know that to forward a message to node 134 it should send the message to its neighboring node 37, but it does not know the route the message takes from node 37 to 134.

ZigBee primarily uses technology known as Ad-hoc On-demand Distance Vector (AODV) to automatically construct an ad-hoc network by use of a route discovery process. An originating node broadcasts a route request command, which keeps track of its source, and other characteristics such as the number of nodes traversed and link quality between nodes as it progresses through the network. The destination node receives one or more copies of the broadcast request, and sends back a reply indicating which of the one or more routes discovered to use based on factors such as the number of hops and link quality between nodes. Each of the intermediate nodes maintains a list of immediate neighbor nodes to use for various destination nodes, but does not maintain a complete route.

ZigBee also includes many-to-one routing and source routing in some embodiments (e.g. ZigBee PRO) in which aggregator nodes are used to collect regular messages from multiple other nodes, such as where an aggregator is a gateway node between a ZigBee network and an external network. Source routing allows the aggregator to store complete routes to several other nodes in the network, where the route is determined by an aggregator node broadcast message and reply process. An aggregator sends an aggregator broadcast message through the mesh network, indicating that other nodes are to use many-to-one routing when sending messages to the aggregator. The receiving nodes store a tag indicating which last hop node the aggregator broadcast message came from, and so do not need to conduct route discovery to send messages to the aggregator node. Sending a message to an aggregator using such a stored broadcast message path rather than route discovery is often known as "many-to-one" routing.

The receiving nodes then send reply messages back to the aggregator, and the reply messages record the node addresses of each node traversed to reach the aggregator. The aggregator receives the reply message and node route information, and stores the entire route from the replying node to the aggregator in a source routing table. Aggregator messages sent using source routing will therefore take the path specified in the source route stored in the table rather than using neighbor node data stored in the individual network nodes to reach the destination node. This enables the aggregator to send messages to nodes for which it has source routing table entries without performing route discovery, reducing network congestion around the aggregator node.

Because ZigBee nodes are not given traditional network addresses such as in a TCP/IP network, and routing within the ZigBee network is different than in an IP network, it is difficult for an outside network such as a TCP/IP, SMS, or other network to directly communicate with a specific node in a mesh network. Because mesh networks of sensors are often desirably managed from a single central location, such as a computer system configured to monitor a mesh network of sensors and compile and report the results, it is desirable to facilitate efficient communication between the central server and various mesh network nodes.

One example embodiment of the invention therefore provides a centralized registry of nodes in ZigBee or other mesh networks, allowing ZigBee nodes to be registered with their extended addresses as well as one or more aliases such as a TCP/IP or other network address. In some embodiments this registration is done automatically when nodes register or join a mesh network, while in other examples the registration is user-performed or user-configurable.

This approach enables communication with ZigBee nodes over network protocols other than ZigBee and using applications that do not support or are not aware of ZigBee or other mesh network protocols, and does not require knowledge of the unique addresses or addressing schemes used in the ZigBee network. It further facilitates communication over other network types, such as cellular networks, where the public address that is mobile terminated can be used to communicate with mesh network nodes that have ZigBee addresses and are behind firewalls.

FIG. 1 illustrates an example system including TCP/IP network devices in communication with devices on multiple ZigBee networks, consistent with an example embodiment of the invention. Here, the clients 101 include TCP/IP clients such as a server running a software program to monitor and report on the readings taken from sensors deployed in different ZigBee networks, and other devices such as an SMS device operable to receive alerts from ZigBee networks and to communicate other data with ZigBee devices. The clients are connected via the Internet 102 or another suitable external network and a server 104 to various ZigBee networks via gateway nodes, as shown at 103. The server 104 is operable to serve as a registry for ZigBee or other mesh network environments, and provides a single point of contact for client applications. In other embodiments, the server 104 can execute on the client system 101 or another system, consist of multiple servers, or be configured in another way. The gateway devices in the ZigBee networks are also the coordinator nodes in this example, and so serve as a central point of communication between the Internet and the ZigBee network.

In operation, a gateway device from a ZigBee network such as 103 discovers a new node on its ZigBee network, and registers the node with the server 104. The ZigBee node ID is used as an alias, or another suitable number such as a sensor serial number forwarded from the new node to the server or another suitable identifier is used. The server also provides an interface such as an HTML-accessible web interface for a user to manually enter or alter node configuration information.

The server then provides one or more interfaces that allow client applications such as may be executing or controlled via the client devices 101 to send messages or data to the ZigBee nodes. For example, a web services interface is provided over HTTP, or an SMS messaging interface is provided for mobile device control. Either the unique address of the node or another alias registered in the server 104 is used to specify the destination of the messages or other data sent from the clients. The server looks up the address or alias in the registry, and uses this information to route the messages to the proper network or gateway node. From there, the message is sent over the ZigBee network to the intended recipient node.

In a further example, the server provides a protocol to allow ZigBee commands to be passed through the gateway to the destination ZigBee node in a pass-through mode. The server also provides a protocol and higher level commands that can be interpreted by the server or the gateway to perform other functions, allowing additional processing such as data translation, filtering, etc.

The alias chosen for a destination node in some examples is not unique, but describes multiple nodes, or a type of node, or a location or other group of nodes. For example, a message sent to "warehouse 3 cameras" might be sent to several different nodes each having a security camera in different regions of a specific warehouse, enabling turning the security cameras on or off as a group. In other embodiments, it will be desired that each node have at least one alias that is guaranteed to be unique, and so the server ensures that when a gateway registers a new node it has at least one unique alias.

The examples of the invention described above illustrate how a server can be used to provide a network interface to various nodes in ZigBee networks from a variety of other network types, such as TCP/IP or SMS environments. This eliminates the need to learn program to ZigBee network protocols, and provides user-friendly domain specific naming of ZigBee nodes. Few, if any, changes to client applications will be needed to interact with ZigBee nodes, as the aliases can be configured as the user wishes.

The server 104 in the above example also provides greater functionality than a simple bridge between one network type and another, as the server can route to nodes across multiple ZigBee networks and multiple gateway nodes using the same or differing aliases, as the user desires. In one embodiment, the server receives messages in various formats such as TCP/IP, SMS, or other formats and converts them to ZigBee messages that are forwarded using a node alias to the gateway nodes of one or more ZigBee networks. In another example, the server receives and forwards ZigBee formatted messages that are forwarded to a ZigBee node identified by an alias in the received ZigBee message.

ZigBee nodes in various embodiments can similarly reply to various clients via the server. In one example, the gateway nodes and/or the server aggregate expected replies and send a single message back up the network after all reply messages are received. In another embodiment, messages are sent back upstream as they are received, such that messages from the ZigBee nodes are routed to the gateway node and to the server, where they are translated to the expected network protocol, message type, and alias before being sent to the client.

This enables control of a ZigBee network, and its nodes, from a variety of client types. For example, a cellular telephone can be used to send SMS or MMS messages to control a mesh network of nodes, or a web interface can interact with an HTTP web page provided by server 104 to provide an interface to send messages to network nodes using user-friendly node aliases. It is anticipated that other network technologies will be developed or used over time, any of which can be adapted via the server, its aliasing scheme, and its message forwarding capability to provide communication with ZigBee or other mesh network devices via a server similar to the server of the examples described here.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A wireless mesh network server operable to:
   receive a message to one or more mesh network nodes from a client external to the mesh network, the message comprising an alias, wherein the alias comprises a network node address in a first network type different from a mesh network type, the alias's network node address associated with the one or more mesh network nodes;
   identify the one or more receiving mesh network nodes by the received message alias via an alias table, the alias table associating the alias comprising a network node address in the first network type different from the mesh network type with one or more mesh network nodes; and
   forward the received message to the one or more mesh network nodes identified by the alias,
   wherein the server comprises a computerized system, the server operable to aggregate one or more reply messages from the one or more mesh network nodes.

2. The wireless mesh network server of claim 1, wherein the mesh network comprises a ZigBee network.

3. The wireless mesh network server of claim 1, wherein forwarding the received message to the one or more mesh network nodes identified by the alias comprises forwarding the message to gateway nodes of the one or more mesh networks including the one or more mesh network nodes.

4. The wireless mesh network server of claim 1, the server further operable to forward one or more reply messages from the one or more mesh network nodes to the client external to the mesh network.

5. The wireless mesh network server of claim 4, the server further operable to aggregate at least two of the one or more reply messages before sending an aggregated reply message to the client.

6. The wireless mesh network server of claim 1, wherein the client message comprises one or more of a TCP/IP message, an SMS message, and an HTTP message.

7. The wireless mesh network server of claim 1, wherein forwarding the received message further comprises forwarding a received mesh network message to one or more mesh network nodes in a passthrough mode.

8. A method of operating a wireless mesh network server, comprising:
   receiving a message to one or more mesh network nodes from a client external to the mesh network, the message comprising an alias, wherein the alias comprises a network node address in a first network type different from a mesh network type, the alias's network node address associated with the one or more mesh network nodes;
   identifying the one or more receiving mesh network nodes by the received message alias via an alias table, the alias table associating the alias comprising a network node address in the first network type different from the mesh network type with one or more mesh network nodes;
   forwarding the received message to the one or more mesh network nodes identified by the alias; and aggregating one or more reply messages from the one or more mesh network nodes.

9. The method of operating a wireless mesh network server of claim 8, wherein the mesh network comprises a ZigBee network.

10. The method of operating a wireless mesh network server of claim 8, wherein forwarding the received message to the one or more mesh network nodes identified by the alias comprises forwarding the message to gateway nodes of the one or more mesh networks including the one or more mesh network nodes.

11. The method of operating a wireless mesh network server of claim 8, further comprising forwarding one or more reply messages from the one or more mesh network nodes to the client external to the mesh network.

12. The method of operating a wireless mesh network server of claim 8, further comprising aggregating at least two of the one or more reply messages before sending an aggregated reply message to the client.

13. The method of operating a wireless mesh network server of claim 8, wherein the client message comprises one or more of a TCP/IP message, an SMS message, and an HTTP message.

14. A non-transitory machine-readable medium with instructions stored thereon, the instructions when executed operable to cause a computerized system to:
receive a message to one or more mesh network nodes from a client external to the mesh network, the message comprising an alias, wherein the alias comprises a network node address in a first network type different from a mesh network type, the alias's network node address associated with the one or more mesh network nodes;
identify the one or more receiving mesh network nodes by the received message alias via an alias table, the alias table associating the alias comprising a network node address in the first network type different from the mesh network type with one or more mesh networks;
forward the received message to the one or more mesh network nodes identified by the alias; and
aggregate one or more reply messages from the one or more mesh network nodes.

15. The non-transitory machine-readable medium of claim 14, wherein the mesh network comprises a ZigBee network.

16. The non-transitory machine-readable medium of claim 14, wherein forwarding the received message to the one or more mesh network nodes identified by the alias comprises forwarding the message to gateway nodes of the one or more mesh networks including the one or more mesh network nodes.

17. The non-transitory machine-readable medium of claim 14, the instructions when executed further operable to forward one or more reply messages from the one or more mesh network nodes to the client external to the mesh network.

18. The non-transitory machine-readable medium of claim 17, the instructions when executed further operable to aggregate at least two of the one or more reply messages before sending an aggregated reply message to the client.

19. The non-transitory machine-readable medium of claim 14, wherein the client message comprises one or more of a TCP/IP message, an SMS message, and an HTTP message.

20. A mesh network system, comprising:
one or more wireless mesh networks, each comprising a plurality of mesh network nodes;
a network operable to link the one or more wireless mesh networks to one or more client devices external to the mesh network; and
a wireless mesh network server comprising a part of the network and operable to:
receive a message to one or more mesh network nodes from a client external to the mesh network, the message comprising an alias, wherein the alias comprises a network node address in a first network type different from a mesh network type, the alias's network node address associated with the one or more mesh network nodes;
identify the one or more receiving mesh network nodes by the received message alias via an alias table, the alias table associating the alias comprising a network node address in the first network type different from the mesh network type with one or more mesh network nodes;
forward the received message to the one or more mesh network nodes identified by the alias; and
aggregate one or more reply messages from the one or more mesh network nodes.

* * * * *